United States Patent
Lopez et al.

(10) Patent No.: US 7,762,332 B2
(45) Date of Patent: *Jul. 27, 2010

(54) METHOD OF USING WATER-SUPERABSORBENT POLYMER IN PRODUCTION TUBING AND PIPES

(75) Inventors: Cristian A. Lopez, Corpus Christi, TX (US); Xiaolan Wang, Baton Rouge, LA (US); Qi Qu, Spring, TX (US); Paul H. Javora, Spring, TX (US)

(73) Assignee: BJ Services Company LLC, Houston, TX (US)

( * ) Notice: Subject to any disclaimer, the term of this patent is extended or adjusted under 35 U.S.C. 154(b) by 738 days.

This patent is subject to a terminal disclaimer.

(21) Appl. No.: 11/589,461

(22) Filed: Oct. 30, 2006

(65) Prior Publication Data
US 2007/0167542 A1 Jul. 19, 2007

Related U.S. Application Data

(63) Continuation of application No. 10/662,159, filed on Sep. 12, 2003, now abandoned.

(60) Provisional application No. 60/410,171, filed on Sep. 12, 2002.

(51) Int. Cl.
*E21B 36/00* (2006.01)
*E21B 43/24* (2006.01)
*C09K 8/68* (2006.01)

(52) U.S. Cl. .................. 166/302; 166/367; 507/203; 507/211; 507/221; 507/224; 524/47; 524/55; 524/504

(58) Field of Classification Search ............. 166/302, 166/367; 507/203, 211, 221, 224; 524/47, 524/55, 504
See application file for complete search history.

(56) References Cited

U.S. PATENT DOCUMENTS

| | | | |
|---|---|---|---|
| 2,861,059 A | 11/1958 | Mowry et al |
| 3,661,815 A | 5/1972 | Smith |
| 4,328,864 A | 5/1982 | Friedman |
| 4,558,100 A | 12/1985 | Kightlinger et al. |
| 4,572,295 A | 2/1986 | Walley |
| 4,664,816 A | 5/1987 | Walker |
| 4,769,414 A | 9/1988 | Kightlinger et al. |
| 5,077,336 A | 12/1991 | Nakashita et al. |
| 5,432,000 A | 7/1995 | Young, Sr. et al. |
| 5,465,792 A | 11/1995 | Dawson et al. |
| 5,502,082 A | 3/1996 | Unger et al. |
| 5,785,747 A | 7/1998 | Vollmer et al. |
| 5,886,124 A | 3/1999 | Kightlinger et al. |
| 5,965,651 A | 10/1999 | Ishii et al. |
| 6,399,092 B1 | 6/2002 | Hobson et al. |
| 6,489,270 B1 | 12/2002 | Vollmer et al. |
| 6,497,891 B2 | 12/2002 | Bara |
| 6,908,886 B2 | 6/2005 | Jones et al. |
| 7,316,275 B2 * | 1/2008 | Wang et al. .......... 166/300 |

FOREIGN PATENT DOCUMENTS

EP 0467635 A2 1/1992

OTHER PUBLICATIONS

Technical Bulletin, "Water Lock® Superabsorbent Polymers," Grain Processing Corporation, May 11, 1998.

* cited by examiner

*Primary Examiner*—Helen L. Pezzuto
(74) *Attorney, Agent, or Firm*—Jones & Smith, LLP; John Wilson Jones

(57) ABSTRACT

A thermal insulating packer fluid contains at least one water superabsorbent polymer and optionally water and/or brine, and a viscosifying polymer. The composition is capable of inhibiting unwanted heat loss from production tubing or uncontrolled heat transfer to outer annuli. The viscosity of the composition is sufficient to reduce the convection flow velocity within the annulus.

20 Claims, 1 Drawing Sheet

“METHOD OF USING WATER-SUPERABSORBENT POLYMER IN PRODUCTION TUBING AND PIPES”

This application is a divisional application of U.S. patent application Ser. No. 10/662,159, filed Sep. 12, 2003, now abandoned, which claimed the benefit of U.S. patent application Ser. No. 60/410,171, filed on Sep. 12, 2002.

FIELD OF THE INVENTION

This invention relates to enhancement of the thermal insulation of production tubing or a transfer pipe by use of a novel thermal insulating composition in surrounding annuli which contains at least one water-superabsorbent polymer. The fluid viscosity of the composition is capable of reducing the convection flow velocity within the surrounding annulus of the well or transfer pipe being treated.

BACKGROUND OF THE INVENTION

Undesired heat loss from production tubing as well as uncontrolled heat transfer to outer annuli can be detrimental to the mechanical integrity of outer annuli, cause productivity losses from the well due to deposition of paraffin and asphaltene materials, accelerate the formation of gas hydrates, and destabilize the permafrost in arctic type regions.

Early methods into controlling heat loss and enhancing oil recovery were focused on steam injection operations. For applications where the packer annulus was gas-filled, wellbore heat losses from refluxing annuli were found to be three to six times higher than anticipated for insulated tubing and only 30 to 40 percent less had the injection tubing not have been insulated.

Silicate foams were among the first insulating packer fluids. Such foams were employed in steam injection applications wherein a solution of sodium silicate was placed in a packed-off annulus, and then steam was injected down the tubing. The hot tubing caused the silicate solution to boil, leaving a coating of insulating material, silicate foam of ¼ to ½ inch thick, on the hot tubing surface. Silicate solution that remained in the annulus after steaming for several hours was removed from the annulus by displacing it with water which was removed by gas-lifting or swabbing. The foam insulator exhibited thermal conductivity of about 0.017 Btu/(hr·ft·° F.). However, difficulties were encountered in boiling off the solutions to form the foam. "Hot spots" were also observed to develop adjacent to the uninsulated couplings.

To prevent thermal refluxing, an insulating fluid that filled the entire annulus was chosen as an alternative to the gas filled annulus. Such fluids avoided unwanted heat loss as a result of reduced thermal conduction and/or convection. Oils, such as gelatinous oil based fluids exhibited relatively low thermal conductivity (0.08 Btu/(hr·ft·° F.). For instance, the relative thermal conductivity of this type of fluid was approximately 13 percent that of water. However, environmental restrictions limited the application of such oils. Furthermore, the long-term incompatibility with various elastomers presented concerns.

As an alternative to chemical methods, vacuum insulated tubing was proposed to solve the problem of paraffin deposition in the production tubing. While insulated tubing proved to be an effective method for wellbore insulation, actual heat losses were significant. Heat loss through couplings and other internal structures such as centralizers and valves were seen to account for up to 50 percent of the total heat loss. To fully achieve the potential of insulated tubing, selected rubber-insulated couplings were tested along with a thermal pipe coating. Although improved thermal performance was obtained, maintaining the annulus dry over a long period was difficult, and, heat loss through refluxing could still occur because of damaged and scraped coating, and downhole centralizers, valves and gauges. This problem could be controlled effectively by the use of specially designed aqueous-based (oil-free) insulating packer fluids.

To secure the insulation of wellbore to reduce the heat transfer from the production tubing to the surrounding wellbore, internal annuli, and the riser environment, non-crosslinked insulating fluids, such as those disclosed in U.S. Pat. No. 6,489,270, proved to be solids-free, non-damaging, environmentally friendly, and highly insulating. Their fluid viscosity made it easy to blend and pump them into the annulus; their fluid density being controlled by the amount and type of dissolved salt needed to provide positive control of the wellbore pressure without the risk of solid settling and separation.

Such fluids, when added either into an annulus or riser, effectively reduced undesired heat loss from the production tubing, or heat transfer to outer annuli. In some cases, heat loss from the produced fluids due to conduction and convection can be reduced by more than 90% when compared with conventional packer fluids.

Fluids having improved insulation properties have been sought. Such fluids need to be environmentally friendly, exhibit an inherently low thermal conductivity and must be capable of securing the insulation of the wellbore while reducing the amount of heat transfer from the production tubing to the surrounding wellbore, internal annuli, and riser.

SUMMARY OF THE INVENTION

The invention relates to a thermal insulating composition capable of controlling the heat transfer from a production tubing or transfer pipe to one or more surrounding annuli and the environment. The composition, which exhibits enhanced thermal control and which is particularly effective for deep-water risers, contains at least one water-superabsorbent polymer capable of absorbing, at a minimum, its own weight. The composition may further contain water and/or brine as well as a viscosifying polymer.

The compositions of the invention provide high viscosity at low shear rate range to reduce convection flow velocity within the annulus. In addition, the compositions of the invention provide lower viscosity at high shear rate range to facilitate the fluid placement.

The superabsorbent polymer immobilizes the water/solvent. Since free fluid convection is due to the movement of water/solvent, immobilization of the fluid solvent by the superabsorbent polymer reduces or eliminates undesired free convection.

BRIEF DESCRIPTION OF THE DRAWINGS

In order to more fully understand the drawings referred to in the detailed description of the present invention, a brief description of each drawing is presented, in which.

DETAILED DESCRIPTION OF THE PREFERRED EMBODIMENTS

The thermal insulating composition of the invention contains at least one water-superabsorbent polymer having a large capacity for absorption and retention of water and of aqueous fluids generally. In addition, the composition may contain brine and/or a viscosifying polymer.

The viscosity of the composition is sufficient to reduce the convection flow velocity within the annulus and immobilize the water and/or brine. The thermal insulating fluid of the invention is easy to blend and pump at the rigsite.

As used herein, the term "water-superabsorbent polymer" defines a polymer capable in its dry state of absorbing and retaining a minimum of its own weight in water. In a preferred embodiment, the water-superabsorbent polymer is capable of absorbing a minimum of 20, preferably 100, more preferably 700, and most preferably 1,000, times its own weight in water (i.e., 20 g to about 1,000 g of water absorbed per gram of absorbent polymer). In some instances, the superabsorbent polymer may have a water-absorbing capacity up to 2,000 times its own weight and, in other instances, about 1,500 times its own weight. Such water-absorbing properties are defined under normal conditions of temperature (25° C.) and pressure (760 mm Hg, i.e., 100,000 Pa) and generally for distilled water.

After absorption of the aqueous fluid, the particles of the polymer thus impregnated with aqueous fluid may remain insoluble in the aqueous fluid and thus retain their individual particulate state. The water-superabsorbent polymer may be in the form of particles, fibers, beads, a liquid or a paste. As a bead or solid particulate, the water-superabsorbent polymer may be a water swellable particle having a mean size of less than 20 mm.

Suitable as the water-superabsorbent polymer may be a starch graft acrylonitrile or methacrylonitrile, such as those using ceric salts as catalysts to form starch-acrylonitrile graft copolymers. See, for example, U.S. Pat. No. 2,922,768. Such graft copolymers can also be prepared by the reaction of acrylonitrile with preirradiated starch which is prepared by irradiation of starch with gamma rays or an electron beam. See Reyes, Clark, Comas, Russell, and Rise, Nuclear Applications 6, 509-517(1969).

After the starch polyacrylonitrile graft copolymer is produced to make it valuable as a water-insoluble material having the ability to absorb large amounts of water, it may be saponified. For example, U.S. Pat. No. 3,425,971 is directed to saponification of a graft copolymer in an aqueous potassium hydroxide solution.

Other suitable water-superabsorbent polymers are the alkali metal salts of saponified granular starch-polyacryloni- trile or starch-polymethacrylonitrile (S-PAN) graft copolymers, such as those disclosed in U.S. Pat. No. 3,661,815, herein incorporated by reference. These products are prepared by saponifying starch-polyacrylonitrile graft copolymers in an aqueous alcoholic solution of an alkali metal base. These materials are substantially water-insoluble granular products having the capacity to absorb aqueous liquids and include alkali metal carboxylate salts of a starch-polyacrylonitrile graft copolymer or a starch-polymethacrylonitrile graft copolymer.

Further, water-soluble superabsorbents are those prepared by saponifying polymers of acrylonitrile (PAN), as described in U.S. Pat. No. 2,861,059, also herein incorporated by reference, and include hydrolyzed polyacrylonitrile, polymethacrylonitrile and copolymers of either acrylonitrile or methacrylonitrile containing less than 50 weight percent of other monomers copolymerizable therewith.

Preferred homopolymers and copolymers for use in the invention are those set forth in U.S. Pat. No. 4,558,100 and U.S. Pat. No. 4,769,414, both of which are herein incorporated by reference. Such non-starch homopolymers may be prepared by treating an aqueous mixture of acrylonitrile (or methacrylonitrile) and a polyfunctional monomeric crosslinking agent with a polymerization initiator to achieve polymerization and crosslinking of the acrylonitrile. The resultant crosslinked polyacrylonitrile is then saponified using an aqueous alcoholic solution of an alkali metal base, recovered by washing with an alcohol and filtering, and finally dried to obtain the solid granular superabsorbent. The non-starch homopolymer is classified as poly(2-propenamide-co-2-propenoic acid, sodium salt).

The polyfunctional crosslinking agents used in combination with acrylonitrile or methacrylonitrile to form liquid absorbents in accordance with this invention are of the type that contain a plurality, that is, two or more, of terminal polymerizable ethylenic ($CH_2$=C<) groups per molecule. Examples of such crosslinking agents are N,N'-methylene-bis-acrylamide, N,N'-methylene-bis-methacrylamide, diallyl amine, diallyl acrylamide, diallyl methacrylamide, diallyl ether, diallyl methyl ether, divinyl benzene, diethylene glycol divinyl ether, ethylene glycol diacrylate, ethylene glycol dimethacrylate, propylene glycol diacrylate, propylene glycol dimethacrylate, diethylene glycol diacrylate, diethylene glycol dimethacrylate, tetraethylene glycol diacrylate, tetraethylene glycol dimethacrylate, allyl acrylate, allyl methacrylate, trimethylolpropane triacrylate, trimethylolpropane trimethacrylate, 1,6 hexanediol diacrylate, pentacrythritol triacrylate, glyceryl/propoxy triacrylate and the like. A preferred crosslinking is N,N'-methylene-bis-acrylamide.

The level of crosslinking may be varied to suit specific requirements, however crosslinking agent use levels can vary from about 0.03 to 5.0% (by weight based on monomer). The preferred crosslinking use level range is from about 0.05 to 2.0% (by weight on monomer). The crosslinking monomer can be added before the polymerization is initiated or at the end of the exotherm following the initiation of the polymerization or it can be incorporated at both times. It can also be added continuously throughout the polymerization.

The polymerization initiator can be any of the agents known to catalyze the polymerization of acrylonitrile or methacrylonitrile. Such polymerization initiators include ceric salts as disclosed in U.S. Pat. No. 2,922,768, such as, for example, ceric nitrate, ceric sulfate, ceric ammonium nitrate, ceric ammonium sulfate, ceric ammonium pyrophosphate, ceric iodate, ceric salts of organic acids, e.g., cerium naphthenate and cerium linoleate and the like.

Examples of water-superabsorbent polymers include, but are not limited to:
  starch-grafted polyacrylates;
  acrylamide/acrylic acid copolymers, including sodium salts of such polymers;
  starch-grafted acrylamide/acrylic acid, including sodium and potassium salts of such polymers;
  starch-acrylonitrile graft copolymers;
  homopolymers of polyacrylonitrile;
  isobutylene/maleic anhydride copolymers;
  sodium and potassium salts of carboxymethylcellulose; and
  chitosan/polyvinylpyrrolidone and chitosan/polyethyleneimine combinations.

Commercially available water-superabsorbent polymers include, but are not limited to:

crosslinked sodium or potassium polyacrylates, sold under the names SALSORB CL10, SALSORB CL20, "FSA type 101," and "FSA type 102," by the company Allied Colloids, ARASORB S-310, from Arakawa Chemical, "ASAP 2000" and ARIDALL 1460, from Chemdal, "KI-gel 201K," from Siber Hegner, AQUALIC CA W3, AQUALIC CA W7, and AQUALIC CA W10, from Nippon Shokubai, AQUA KEEP D 50, AQUA KEEP D 60, AQUA KEEP D 65, AQUA KEEP S 30, AQUA KEEP S 35, AQUA KEEP S 45, AQUA KEEP A1 M1, and AQUA KEEP A1 M3, from Atochem, and SANWET IM-5000D, from Hoechst Celanese;

starch-grafted polyacrylates, sold under the names SANWET IM-100, SANWET IM-3900, and SANWET IM-5000S, from Hoechst;

starch-grafted acrylamide/acrylic acid copolymers, in the form of the sodium or potassium salt, sold under the names WATERLOCK A-100, WATERLOCK A-200, WATERLOCK D-200, and WATERLOCK B-204, from Grain Processing Corporation;

acrylamide/acrylic acid copolymers, in the form of the sodium salt, sold under the name WATERLOCK G-400, from Grain Processing Corporation;

isobutylene/maleic anhydride copolymer, sold under the name "KI Gel-201 K";

carboxymethylcellulose, sold under the name AQUASORB A250, from Aqualon; and chitosan/polyvinylpyrrolidone combinations, sold under the name "Hydrogel AQUATRIX 2," and chitosan/polyethyleneimine combinations, sold under the name "Hydrogel AQUATRIX 3," from Hydromer.

The most preferred superabsorbent polymers are those sold by Grain Processing Corporation, Muscatine, Iowa, under the trademark Water Lock® Superabsorbent Polymer, with the preferred Water Lock polymer being the WATER LOCK® G-400 series, which is a homopolymer material classed as a Poly (2-propenamide-co-2-propenoic acid, sodium salt). The most preferred Water-Lock is G-504. The water-superabsorbent polymer may be present in the inventive compositions in an amount ranging from about 0.05 to about 30% by weight, relative to the total weight of the composition, preferably from about 0.2 to about 20% by weight.

The composition of the invention may further contain a brine and/or water and a viscosifying polymer and, optionally, a polyol, buffer, biocide and/or corrosion inhibitor. Further, the composition may contain a crosslinking agent. The biocides as well as buffers and corrosion inhibitors suitable for use in the invention are those known in the art and are employed in amounts recognized in the art.

Viscosifying polymers, such as CMHPG, are not necessary to practice this invention. Thus, the composition may contain the water-superabsorbent polymer without supplementary polymers, brine or polyol. Further, it is possible for the insulating fluid to contain no water. (The water-superabsorbent polymer is defined herein as a polymer capable in its dry state of absorbing and retaining a minimum of its own weight in water.) This does not mean, however, that the insulating fluid of the invention must contain water or that the water-absorbent polymer is only capable of absorbing water. Thus, an insulating fluid with superior insulation properties can be formulated as follows: 0.05 to 20% by weight of water-superabsorbent polymer; 0 to 99.95% by weight of water and/or brine containing inorganic or organic salts; 0 to about 5% by weight of polysaccharides and/or other viscosifying polymers; and 0 to 95% of polyol.

Preferably, the thermal insulating composition of the invention contains from about 20 to about 99 weight percent water or brine. The brine may be saturated or unsaturated brine. By saturated brine, it is understood that the brine is saturated with at least one salt.

The water-superabsorbent polymer and, if desired, the viscosifying polymer and, when further desired, polyol, are typically added to the water and/or brine. In a preferred embodiment, the water-superabsorbent polymer and the viscosifying polymer are added to the polyol which is then mixed with the aqueous brine. In one embodiment of the present invention, the fluid is substantially free of water.

Suitable viscosifying polymers include those which may be crosslinkable and preferably include polysaccharides, anionic as well as nonionic, such as guar gums and derivatives, cellulose, starch, and galactomannan gums as well as polyvinyl alcohols, polyacrylates, polypyrrolidones and polyacrylamides and mixtures thereof. In addition, the viscosifying polymer of the invention may be a block or random copolymer containing units selected from vinyl alcohol, acrylates, including the (meth)acrylates, pyrrolidone, 2-acrylamido-2-methylpropane sulfonate and acrylamide including the (meth)acrylamides.

Cellulose and cellulose derivatives include alkylcellulose, hydroxyalkyl cellulose or alkylhydroxyalkyl cellulose, carboxyalkyl cellulose derivatives such as methyl cellulose, hydroxyethyl cellulose, hydroxypropyl cellulose, hydroxybutyl cellulose, hydroxyethylmethyl cellulose, hydroxypropylmethyl cellulose, hydroxylbutylmethyl cellulose, methylhydroxyethyl cellulose, methylhydroxypropyl cellulose, ethylhydroxyethyl cellulose, carboxyethylecellulose, carboxymethylcellulose and carboxymethylhydroxyethyl cellulose. The polysaccharides also include microbial polysaccharides such as xanthan, succinoglycan and scleroglucan as well as galactomannan gums and derivatized galactomannan gums.

Specific examples of polysaccharides useful with the present invention include but are not limited to guar gum, hydroxypropyl guar, carboxymethylhydroxypropyl guar and known derivatives of these gums.

The viscosifying polymer is typically present in the thermal insulating composition at a range between from about 0.1 to about 5, preferably from about 1 to about 3, weight percent. The viscosifier is included in the present invention to provide a fluid having a viscosity sufficient to reduce the convection flow velocity within the annulus.

The composition of the invention may further include a polyol as a solvent. Such solvents are of assistance in keeping the viscosifying polymer dispersed in the composition and to prevent it from decomposing while being subjected to the extreme conditions offered by deep wellbores. In addition, the polyol serves to reduce the thermal conductivity of the composition and thus imparts thermal insulation to the composition. In a preferred embodiment, the viscosifying polymer is introduced to the polyol and the resulting slurry is then added to the brine and the crosslinking agent, if present.

The viscosifier for use in the composition of the invention may include clay and clay-like materials which further impart viscosity to the composition. Such materials may be used in addition to the viscosifying agents referenced above. The polyol solvent, in such circumstances, is compatible with such materials.

The polyol is preferably glycerol, a glycol or a polyglycols and mixtures thereof. The glycols include commonly known glycols such as ethylene glycol, propylene glycol and butylene glycol. The polyglycols can be selected from a wide range of known polymeric polyols that include polyethylene glycol, poly(1,3-propanediol), poly(1,2-propanediol), poly (1,2-butanediol), poly(1,3-butanediol), poly(1,4-butanediol), poly(2,3-butanediol), co-polymers, block polymers and mixtures of these polymers. A wide variety of polyglycols is commercially available. Most commercially available polyglycols include polyethylene glycol, and are usually designated by a number that roughly corresponds to the average molecular weight. Examples of useful commercially available polyethylene glycols include polyethylene glycol 4000 and polyethylene glycol 6000. Preferably the polymeric polyols for use in the present invention are selected to have a number average molecular weight, $M_n$, of about 150 to about 18,000 Daltons. More preferably, the polymeric polyols are selected to have number average molecular weight of about 190 to about 10,000 D. Yet most preferably, the polymeric polyols are selected to have number average molecular weight of about 500 to about 8,000 D. When present, the composition of the invention will typically contain between from about 10 to about 80 wt % of polyol.

Use of polyglycols having the described number average molecular weight in the present invention provide a fluid that exhibits stable rheological properties especially at elevated temperatures and over extended periods of time These polyglycols are particularly well suited for deep wellbores that exert high temperature and pressures on fluids.

The thermal insulating compositions of the invention may further contain a crosslinking metal-releasing agent. As used herein, the term "crosslinking metal-releasing agent" is taken to designate those metal or metal containing materials which will provide a metal ion or metal containing species in the solution capable of crosslinking the viscosifying polymer.

The crosslinking agent preferably comprises a borate ion releasing compound, an organometallic or organic complexed metal ion comprising at least one transition metal or alkaline earth metal ion as well as mixtures thereof, such as Zr (IV) and Ti (IV). Typically, the crosslinking agent is employed in the composition in a concentration of from about 0.001 percent to about 2 percent, preferably from about 0.005 percent to about 1.5 percent, and, most preferably, from about 0.01 percent to about 1.0 percent.

Borate ion releasing compounds which can be employed include, for example, any boron compound which will supply borate ions in the composition, for example, boric acid, alkali metal borates such as sodium diborate, potassium tetraborate, sodium tetraborate (borax), pentaborates and the like and alkaline and zinc metal borates. Such borate ion releasing compounds are disclosed in U.S. Pat. No. 3,058,909 and U.S. Pat. No. 3,974,077 herein incorporated by reference. In addition, such borate ion releasing compounds include boric oxide (such as selected from $H_3BO_3$ and $B_2O_3$) and polymeric borate compounds. An example of a suitable polymeric borate compound is a polymeric compound of boric acid and an alkali borate which is commercially available under the trademark POLYBOR® from U.S. Borax of Valencia, Calif.. Mixtures of any of the referenced borate ion releasing compounds may further be employed. Such borate-releasers typically require a basic pH (e.g., 7.0 to 12) for crosslinking to occur.

Further preferred crosslinking agents are reagents, such as organometallic and organic complexed metal compounds, which can supply zirconium IV ions such as, for example, zirconium lactate, zirconium lactate triethanolamine, zirconium carbonate, zirconium acetylacetonate and zirconium diisopropylamine lactate; as well as compounds that can supply titanium IV ions such as, for example, titanium ammonium lactate, titanium triethanolamine, and titanium acetylacetonate. Zr (IV) and Ti (IV) may further be added directly as ions or oxy ions into the composition.

Such organometallic and organic complexed metal crosslinking agents containing titanium or zirconium in a +4 valence state include those disclosed in British Pat. No. 2,108, 122, herein incorporated herein by reference, which are prepared by reacting zirconium tetraalkoxides with alkanolamines under essentially anhydrous conditions. Other zirconium and titanium crosslinking agents are described, for example, in U.S. Pat. No. 3,888,312; U.S. Pat. No. 3,301,723; U.S. Pat. No. 4,460,751; U.S. Pat. No. 4,477,360; Europe Pat. No. 92,755; and U.S. Pat. No. 4,780,223, all of which are herein incorporated by reference. Such organometallic and organic complexed metal crosslinking agents containing titanium or zirconium in a +4 oxidation valance state may contain one or more alkanolamine ligands such as ethanolamine (mono-, di- or triethanolamine) ligands, such as bis(triethanolamine)bis(isopropol)-titanium (IV). Further, the compounds may be supplied as inorganic oxides, such as zirconium or titanium dioxide. Such crosslinking agents are typically used at a pH also in the range from about 6 to about 13.

Any suitable crosslinking metal ion, metal containing species, or mixture of such ions and species may further be employed. In a preferred embodiment, the crosslinking agent for use in the thermal insulating composition of the invention are reagents capable of providing Zn (II), calcium, magnesium, aluminum, Fe (II), and Fe (III) to the composition. These may be applied directly to the composition as ions or as polyvalent metallic compounds such as hydroxides and chlorides from which the ions may be released.

The crosslinking ions or species may be provided, as indicated, by dissolving into the solution compounds containing the appropriate metals or the metal ion per se. The concentration of crosslinking agent is dependent on factors such as the temperature in the annuli and will normally range from about 5 ppm to about 2000 ppm, preferably from about 100 ppm to about 900 ppm. It is an important advantage of the invention that higher levels of the crosslinking metal ion or metal containing species may be employed, thereby insuring improved crosslinking. When desired, crosslinking typically occurs after the thermal insulating composition is within the annuli.

Zirconium crosslinkers, such as those described in British Pat. No. 2,108,122, are a preferred class of crosslinkers for use herein. Such crosslinkers are preferred because of their "delayed" or "retarded" crosslinking reactivity. This delayed activity is useful because it lets the operator formulate and pump the uncrosslinked composition while it has a relatively lower viscosity which means easier pumping. The delayed systems are usually designed to crosslink while the fluid is being pumped through the wellbore tubing and/or as the fluid enters into the annuli.

The thermal insulating composition of the invention is prepared on the surface and then pumped through tubing in the wellbore or in the annulus. In a preferred embodiment, the fluid is a packer or riser fluid and the packer fluid is introduced above the packer in an annulus and the riser fluid is introduced into a riser annulus.

While high viscosity, thickened fluid is highly desirable after the fluid is positioned in the annulus, large amounts of energy are required to pump such fluids through tubing and annular spaces. Crosslinking, when desired, may be delayed, thereby reducing the amount of energy required to pump viscous fluids through the tubing by permitting pumping of a relatively less viscous fluid having relatively low friction pressures within the well tubing. Crosslinking is typically effected when the fluid is placed in the annulus after which the advantageous properties of thickened crosslinked fluid are then available for thermal insulation.

The composition, when pumped into an annuli surrounding the production tubing or transfer piping, enhances the thermal insulating quality around the tubing or piping, thereby reducing heat loss from it. The composition further provides high viscosity at low shear rate so as to reduce the rate of fluid convection to near zero. Since convection is fluid motion caused by the variation of fluid density with temperature, increasing fluid viscosity decreases fluid motion, and correspondingly, decreases free annular convection. Thus, the desired rheological profile for the insulating fluid of the invention includes high viscosity at low shear rate in order to reduce the free fluid convection caused by temperature differential. Additionally, a low viscosity at high shear rate is desired to facilitate the placement of the insulating fluid at the desired location.

The thermal insulating compositions should be approached on a specific project basis to meet a target objective in terms of viscosity and density. Density is normally dictated by the required hydrostatic pressure needed to control the well, and may be achieved by the amount and type of salt dissolved within the composition (resulting from the brine, etc). The densities of the thermal insulating compositions of the invention are controlled by operational considerations such as additives to the fluids, hydration time of viscosifier, and requirements for low crystallization temperatures (both true crystallization temperature (TCT) and pressure crystallization temperature (PCT). Densities to 13.0 pounds per gallon have been evidenced for the crosslinked thermal insulating compositions. It is important that the compositions are formulated to have an appropriate low crystallization temperature for the adverse conditions of deep water. The crosslinked insulating compositions have low pressure crystallization temperatures significantly less than 30° F. at 10,000 psi.

The thermal insulating composition of the invention may be produced in shore-based facilities, transported to, and pumped from marine well-servicing boats into riser annuli. This provides a convenient means to blend, temporarily store, and then pump large quantities of fluid into the wellbore and riser annuli, without using rig tanks.

The thermal insulating composition of the invention further offers environmental benefits since no oil sheen will be produced if the composition is spilled since the composition is oil-free. Further, while the fluid compositions vary according to specific well conditions, the components of the composition are environmentally friendly especially since the composition is solids-free.

The composition of the invention may serve a dual purpose. First, they serve to prevent heat transfer/buildup in the outer annuli. Second, they serve to retain heat within the produced hydrocarbons. The compositions further provide lower viscosity at high shear rate to facilitate the fluid placement.

The following examples will illustrate the practice of the present invention in a preferred embodiment. Other embodiments within the scope of the claims herein will be apparent to one skilled in the art from consideration of the specification and practice of the invention as disclosed herein. It is intended that the specification, together with the example, be considered exemplary only, with the scope and spirit of the invention being indicated by the claims which follow.

EXAMPLES

Unless stated to the contrary, all percentages expressed herein, refer to weight percentage.

The following abbreviations are further used:
CMHPG is carboxymethyl hydroxypropyl guar;
A-100, C-200, G-400, G-404, G-500, G-504 and G-544 refer to superabsorbent polymers, sold commercially under the Water Lock® product from Grain Processing Corp., Muscatine, Iowa;
"Brine" refers to a conventional NaBr brine which consists of water, propylene glycol (25 volume %), and sodium bromide salt (density=1.08 g/ml, or 9 pound/gallon);
"Non-crosslinked insulating fluid" or "ABIF" is an insulation fluid as taught in U.S. Pat. No. 6,489,270, with 4 pound per barrel of CMHPG, respectively, to 9.0 ppg Brine.

Example 1

Example 1 Examines the Rheology of an Insulating Fluid of the Invention 8 g of carboxymethyl hydroxypropyl guar (CMHPG) and 4 g of superabsorbent polymer G-504 (e.g. Water Lock product from Grain Processing Corp., Muscatine, Iowa) were added to 175 milliliters of propylene glycol under stir. After mixing for 5 minutes, this mixture was added to 525 milliliters of 9.14 lb/gallon sodium bromide brine (final density=1.08 g/ml, or 9 pound/gallon) under rapid agitation.

After hydrating the mixture by a mechanical stirrer for 30 minutes, the pH was adjusted to about 9.5 with sodium hydroxide.

Thereafter, a 40 milliliter sample of the hydrated fluid was placed into a Fann 50C viscometer cup. The cup was then placed on a Fann 50C viscometer and pressured to about 200 psi (14 kg/cm$^2$) with nitrogen. The sample, also referred to herein as "ATIF", was sheared at 450 sec$^{-1}$ for 2 minutes, followed by a rate sweep using 105, 85, 64, and 42 sec$^{-1}$ for about 2 minutes. The oil bath temperature was pre-set to 120° F. (49° C.) and the bath was raised to submerge the sample cup. The rate sweep was repeated every 30 minutes, and the interim rate between sweeps was 105 sec$^{-1}$. The stresses associated to each rate used in the sweep together with the rates were used to calculate the power law indices n and K; n refers to flow behavior index and K refers to consistency index set forth in the American Petroleum Institute's Bulletin RP-39. The fluid viscosity was then calculated by using n and K values, and listed in Table I.

TABLE I

| Time Minute | Temperature ° F. | n | K mPa·s$^n$ | Rate 1 40/second Viscosity 1 CentiPoise | Rate 2 100/second Viscosity 2 CentiPoise | Rate 3 170/second Viscosity 3 CentiPoise |
|---|---|---|---|---|---|---|
| 32.1 | 120 | 0.2621 | 0.3564 | 1122 | 571 | 386 |
| 62.1 | 120 | 0.2549 | 0.3730 | 1143 | 578 | 389 |

TABLE I-continued

| Time Minute | Temperature °F. | n | K mPa·s" | Rate 1 40/second Viscosity 1 CentiPoise | Rate 2 100/second Viscosity 2 CentiPoise | Rate 3 170/second Viscosity 3 CentiPoise |
|---|---|---|---|---|---|---|
| 92.1 | 120 | 0.2529 | 0.3793 | 1154 | 582 | 392 |
| 122.1 | 120 | 0.2544 | 0.3777 | 1156 | 584 | 393 |
| 152.1 | 120 | 0.2483 | 0.3874 | 1159 | 582 | 391 |
| 182.1 | 120 | 0.2547 | 0.3774 | 1156 | 584 | 393 |

Figure 1:
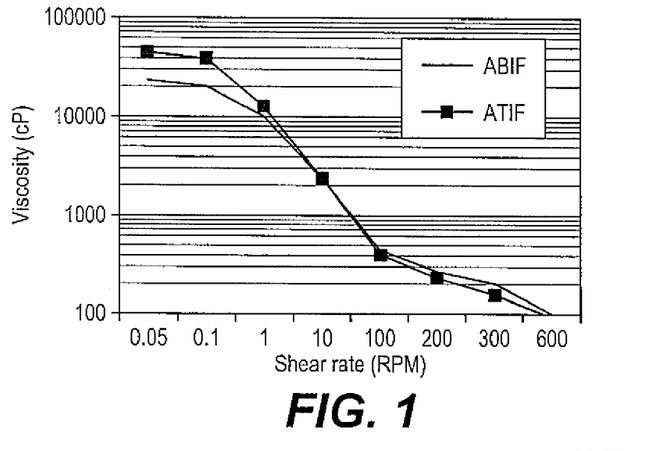
FIG. 1 illustrates the rheology profile of a thermal insulating composition of the invention and the composition of the prior art.

The viscosity profile of a thermal insulating fluid of the prior art, ABIF, and the system of this Example, ATIF, with the same viscosifier concentration is presented in FIG. 1. While the ATIF has lower viscosity at shear rates above 10 rpm, its viscosity at low shear rate range is significantly higher than the ABIF.

That ATIF may be produced on shore and transported to and pumped from marine well-servicing boats into riser annuli with no difficulty is evident by the lower high-shear viscosity of the ATIF system versus the higher high-shear viscosity of ABIF. Thus, the compositions of the invention provide a convenient means to blend, temporarily store, and then pump large quantities of fluid into wellbore and riser annuli, without using rig tanks.

Example 2

Example 2 Examines the Convection Rate of the Insulating Fluid of this Application VS. an Insulating Fluid of the Prior Art 4 g of CMHPG and 20 g of G-504 were added to 175 milliliters of propylene glycol under stir. After mixing for 5 minutes, this mixture was added to 525 milliliters of 9.14 lb/gallon sodium bromide brine (density=1.08 g/ml, or 9 pound/gallon) under rapid agitation. After hydrating the mixture by a mechanical stirrer for 30 minutes, 0.5 ml of blue food color was added and the pH was adjusted to about 9.5 with sodium hydroxide. Similarly, an invented fluid of pink color was prepared with the same chemical compositions except a pink food color was used as indicator. The equipment for measuring convection rate consisted of two concentric glass tubes with the annulus sealed. Cold water (77° F.) was flowed through Tygon® tubing that was wrapped around the outer glass tube and hot water (170° F.) was flowed through the inner glass tube. The annulus was filled halfway with blue colored invented insulating fluid in the bottom, and halfway with pink colored invented insulating fluid on top.

Figure 2:
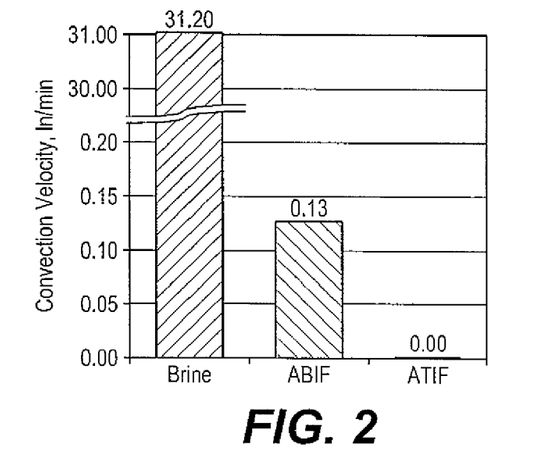
FIG. 2 illustrates convection rates exhibited by the thermal insulating fluid of the invention versus an insulating fluid of the prior art as well as brine per se, as discussed below in Example 2.

Free convection is fluid motion caused by the variation of temperatures across the annulus. When convection occurs, fluid close to the hot inner glass tube would rise while fluid close to the cold outer glass tube would descend. Therefore, the convection rate could be calculated by measuring the migrated distance of the colored fluid from the initial interface of these two different colored fluids at a given time. The convection rates on various insulating fluids are reported in the graph set forth in FIG. 2.

While clear completion fluids can be obtained with density up to 21 pounds per gallon, densities to 13.0 pounds per gallon have been exhibited for ATIF.

Example 3

Figure 3:
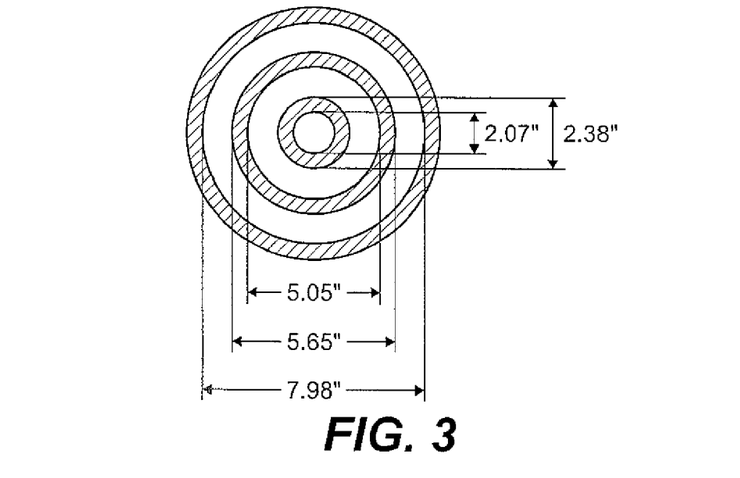
FIG. 3 illustrates the concentric tube dimensions for a heat transfer apparatus used to determine the thermal effectiveness of exemplified fluids.

Example 3 Examines the Thermal Effectiveness of Certain Fluids Using a Laboratory-sized Heat Transfer Apparatus The thermal insulating properties of thermal insulating fluids (ATIF, ABIF) were evaluated in a laboratory-sized heat transfer apparatus to determine the thermal effectiveness of the fluids. The heat transfer apparatus consisted of three concentric aluminum pipes connected and sealed by two flanges. The physical dimensions are shown in FIG. 3. Hot fluid at constant temperature was circulated in the inner pipe, while cold fluid at constant temperature was circulated in the outer annulus. The test insulating-fluid was contained in the annulus between the hot and cold reference fluids. The top and bottom of the apparatus were insulated to assure that heat flow was in the radial direction.

Hot fluid enters the inner pipe at the bottom and leaves the pipe at the top at approximately 1 gallon/minute to provide a hot surface at the inner annulus wall. The cold water is fed to the outside pipe of the heat transfer apparatus with a flow rate of 3 gallon/minute to provide a cold wall annulus adjacent to the packer annulus. The test insulating-fluid remains static in the packer annulus. Thermocouples were positioned on the inner wall (hot surface) and outer wall (cold surface) of the annulus, and at the inlet and outlet ports for the hot and cold flowing water.

During the test, hot water and cold water temperatures were set at 180° F. and 50° F., respectively. After thermal equilibrium was achieved (2 to 3 hours) for a given test, data was collected to calculate heat transfer coefficient and apparent thermal conductivity and summarized in Table II:

TABLE II

|  | U (heat transfer coefficient) btu/hr · ft² · ° F. | K (effective thermal conductivity) btu/hr · ft · ° F.) |
|---|---|---|
| Solvent | 29.88 | 3.34 |
| ABIF | 2.67 | 0.30 |
| ATIF: 4/2[1] | 2.34 | 0.26 |
| ATIF: 3/3[1] | 1.83 | 0.20 |

[1]ATIF as prepared in Example 4 except using 4 lbs/barrel CMHPG, 2 lbs/barrel G-504; and 3 lbs/barrel CMHPG, 3 lbs/barrel G-504, respectively.

Example 4

Example 4 Illustrates the Effect of Polymer Concentrations on the Rheological Behavior of the Insulating Fluids Designated amount of carboxymethyl hydroxypropyl guar (CMHPG) and superabsorbent polymer G-504 (e.g. Water Lock product from Grain Processing Corp., Muscatine, Iowa) were added to 175 milliliters of propylene glycol under stir. After mixing for 5 minutes, this mixture was added to 525 milliliters of 9.14 lb/gallon sodium bromide brine (final density=1.08 g/ml, or 9 pound/gallon) under rapid agitation.

After hydrating the mixture by a mechanical stirrer for 30 minutes, the pH was adjusted to about 9.5 with sodium hydroxide.

Thereafter, a 300 milliliter sample of the hydrated fluid was placed into a Grace 3500 viscometer cup. The cup was then placed on a Grace 3500 viscometer. The sample was sheared by a rate sweep using 0.09, 0.17, 1.7, 17, 170, 340, 511, 1021 sec$^{-1}$ for about 1 minute. The stresses associated to each rate used in the sweep together with the rates were used to calculate the power law indices n and K; n refers to flow behavior index and K refers to consistency index set forth in the American Petroleum Institute's Bulletin RP-39. The fluid viscosity was then calculated by using the n and K values, and listed in Table III.

TABLE III

Viscosity (cp) of the Invented Insulating Fluid of Different Polymer Concentrations at Different Shear Rate at 80° F.

| Super absorbency Polymer | Shear Rate (sec$^{-1}$) | | | | | | | |
|---|---|---|---|---|---|---|---|---|
| | 0.09 | 0.17 | 1.70 | 17.0 | 170 | 340 | 511 | 1021 |
| 4/2 | 55219 | 44547 | 15018 | 2976 | 492 | 283 | 222 | 137 |
| 4/1 | 38770 | 32501 | 12121 | 2548 | 444 | 266 | 206 | 128 |
| 4/0 | 22910 | 19776 | 8361 | 1985 | 371 | 224 | 167 | 116 |
| 3/3 | 17622 | 15861 | 6707 | 1566 | 301 | 181 | 133 | 83 |
| 3/2 | 14293 | 12531 | 5648 | 1424 | 280 | 169 | 125 | 80 |
| 3/1 | 10181 | 9496 | 4610 | 1237 | 250 | 152 | 115 | 74 |
| 3/0 | 5874 | 5482 | 3308 | 975 | 212 | 133 | 101 | 65 |

4/2: 4 lbs/barrel CMHPG, 2 lbs/barrel G-504.
4/1: 4 lbs/barrel CMHPG, 1 lbs/barrel G-504.
4/0: 4 lbs/barrel CMHPG, 0 lbs/barrel G-504.
3/3: 3 lbs/barrel CMHPG, 3 lbs/barrel G-504.
3/2: 3 lbs/barrel CMHPG, 2 lbs/barrel G-504.
3/1: 3 lbs/barrel CMHPG, 1 lbs/barrel G-504.
3/0: 3 lbs/barrel CMHPG, 0 lbs/barrel G-504.

Example 5

Example 5 Examines the Effect of Different Superabsorbent Polymers on the Rheological Behavior of Insulating Fluids 4 g of carboxymethyl hydroxypropyl guar (CMHPG) and 2 g of designated superabsorbent polymer were added to 175 milliliters of propylene glycol under stir. After mixing for 5 minutes, this mixture was added to 525 milliliters of 9.14 lb/gallon sodium bromide brine (final density=1.08 g/ml, or 9 pound/gallon) under rapid agitation. After hydrating the mixture by a mechanical stirrer for 30 minutes, the pH was adjusted to about 9.5 with sodium hydroxide. Thereafter, a 300 milliliter sample of the hydrated fluid was placed into a Fann 35 viscometer cup. The cup was then placed on a Fann 35 viscometer. The sample was sheared by a rate sweep using 3, 6, 100, 200, 300, 600 RPM. The fluid viscosity was then calculated by the readings on the Fann 35 viscometer, and listed in Table IV.

TABLE IV

Viscosity (cp) of the Invented Insulating Fluid with Different Superabsorbent Polymers at Different Shear Rates at 80° F.

| Super absorbency Polymer | Shear Rate (RPM) | | | | | |
|---|---|---|---|---|---|---|
| | 3 | 6 | 100 | 200 | 300 | 600 |
| A-100 | 5500 | 3500 | 441 | 269 | 200 | 120 |
| C-200 | 6000 | 3600 | 462 | 267 | 197 | 123 |
| G-400 | 6100 | 3750 | 465 | 264 | 196 | 125 |
| G-404 | 5600 | 3500 | 450 | 270 | 206 | 127 |
| G-500 | 5500 | 3400 | 438 | 264 | 198 | 127 |
| G-504 | 5200 | 3250 | 426 | 258 | 193 | 123 |
| G-544 | 5100 | 3250 | 426 | 258 | 194 | 122 |

From the foregoing, it will be observed that numerous variations and modifications may be effected without departing from the true spirit and scope of the novel concepts of the invention.

What is claimed is:

1. A method for reducing convection flow velocity in at least one annuli surrounding a production tubing or transfer pipe, comprising:

introducing into the at least one annuli an insulating packer or riser fluid comprising a composition comprising at least one crosslinked water-superabsorbent polymer capable of absorbing a minimum of its own weight in water; and     maintaining the fluid in the at least one annuli until the convection flow velocity is reduced.

2. The method of claim 1, wherein the packer fluid is introduced above the packer in an annulus and the riser fluid is introduced into a riser annulus.

3. The method of claim 1, wherein the composition further comprises a viscosifying polymer.

4. The method of claim 3, wherein the viscosifying polymer is a polysaccharide or a homo-, block or random polymer containing vinyl alcohol, acrylate, pyrrolidone, 2-acrylamido-2-methylpropane sulfonate, or acrylamide units.

5. The method of claim 1, wherein the composition further comprises water and/or brine.

6. The method of claim 4, wherein the polysaccharide is alkylcellulose, hydroxyalkyl cellulose, alkylhydroxyalkyl cellulose, carboxyalkyl cellulose derivative, guar gum, hydroxypropyl guar, or carboxymethylhydroxypropyl guar.

7. The method of claim 1, wherein the at least one crosslinked water-superabsorbent polymer is capable of absorbing a minimum of 20 times its own weight in water.

8. The method of claim 1, wherein the at least one crosslinked water-superabsorbent polymer is selected from the group consisting of:
   (a) an alkali metal salt of an aqueous alcoholic alkali saponified crosslinked homopolymer of acrylonitrile or methacrylonitrile;
   (b) an alkali metal salt of an alcoholic saponified crosslinked polymer of 2-propenenitrile or 2-methyl-2-propenenitrile;
   (c) starch-grafted polyacrylates;
   (d) acrylamide/acrylic acid copolymers and salts thereof;
   (e) starch-grafted acrylamide/acrylic acid and salts thereof;
   (f) isobutylene/maleic anhydride copolymers;
   (g) sodium and potassium salts of carboxymethylcellulose;
   (h) crosslinked salts of polyaspartic acid; and
   (i) chitosan/polyvinylpyrrolidone and chitosan/polyethyleneimine combinations.

9. The method of claim 1, wherein the composition is prepared on the surface and then added to the one or more surrounding annuli.

10. The method of claim 7, wherein the at least one crosslinked water-superabsorbent polymer is capable of absorbing a minimum of 100 times its own weight in water.

11. The method of claim 10, wherein the at least one crosslinked water-superabsorbent polymer is capable of absorbing a minimum of 1,000 times its own weight in water.

12. The method of claim 11, wherein the at least one crosslinked water-superabsorbent polymer is capable of absorbing a minimum of 1,500 times its own weight in water.

13. The method of claim 12, wherein the at least one crosslinked water-superabsorbent polymer is capable of absorbing a minimum of 2,000 times its own weight in water.

14. The method of claim 1, wherein the composition further comprises a polyol.

15. The method of claim 6, wherein the polysaccharide is carboxymethylhydroxypropyl guar.

16. The method of claim 8, wherein the at least one water-superabsorbent polymer is a sodium or potassium salt of a starch-grafted acrylamide/acrylic acid copolymer.

17. A method for reducing convection flow velocity in at least one annuli surrounding a production tubing or transfer pipe, comprising:
   introducing into the at least one annuli an aqueous fluid comprising at least one crosslinked water-superabsorbent polymer capable of absorbing a minimum of its own weight in water, wherein the crosslinked water-superabsorbent polymer is insoluble in the aqueous fluid; and
   maintaining the fluid in the at least one annuli until the convection flow velocity is reduced.

18. The method of claim 17, wherein the at least one crosslinked water-superabsorbent polymer is capable of absorbing a minimum of 100 times its own weight in water.

19. The method of claim 18, wherein the at least one crosslinked water-superabsorbent polymer is a particle, fiber, bead, liquid or paste.

20. The method of claim 18, wherein the at least one water-superabsorbent polymer is a sodium or potassium salt of a starch-grafted acrylamide/acrylic acid copolymer.

* * * * *

UNITED STATES PATENT AND TRADEMARK OFFICE
CERTIFICATE OF CORRECTION

| | | |
|---|---|---|
| PATENT NO. | : 7,762,332 B2 | Page 1 of 1 |
| APPLICATION NO. | : 11/589461 | |
| DATED | : July 27, 2010 | |
| INVENTOR(S) | : Lopez et al. | |

It is certified that error appears in the above-identified patent and that said Letters Patent is hereby corrected as shown below:

On the Title page, under Item 63, Related U.S. Application Data, Paragraph (63), delete "Continuation" and replace with "Divisional"

Signed and Sealed this
Twelfth Day of April, 2011

David J. Kappos
*Director of the United States Patent and Trademark Office*